United States Patent Office 2,773,105
Patented Dec. 4, 1956

2,773,105

DEHYDROCHLORINATION OF BENZENE HEXACHLORIDE

Alfred J. Kolka, Birmingham, Mich., assignor to Ethyl Corporation, New York, N. Y., a corporation of Delaware No Drawing. Application November 24, 1951, Serial No. 258,100

4 Claims. (Cl. 260—650)

This invention relates to the dehydrochlorination of organic chlorine compounds and more particularly to a new and improved catalytic method for the dehydrochlorination of benzene hexachloride and similar compounds, characterized by an unusual and novel distribution of products.

The dehydrochlorination of benezene hexachloride has been traditionally carried out by thermal treatment at temperatures in the vicinity of 275–500° C., usually in the presence of a catalyst, such as iron or ferric chloride. This is a suitable method for the preparation of trichlorobenzene, particularly when an outlet for the non-gamma isomers of benzene hexachloride is thereby provided. However, this procedure is inefficient in that large quantities of 1,2,3-trichlorobenzene, for which there exists no market outlet, are produced along with the desired 1,2,4-isomer. The 1,3,5- isomer is produced only in negligible amounts. The dehydrochlorination product, therefore, must be purified by a difficult and costly fractionation operation or the crude mixture must be sold at a reduced premium. Further disadvantages of this method of dehydrochlorination of benzene hexachloride lie in the fact that the reaction rate is somewhat slow at practicable temperatures, thus limiting the production per unit amount of equipment, and that, in order to increase the reaction rate to a more economical velocity, excessive temperatures must be employed.

In addition the hydrogen chloride produced by this method is ordinarily contaminated with varying amounts of organic material and in order to recover this hydrogen chloride in pure form it is necessary to contact it with an adsorbent for organic compounds to obtain pure hydrogen chloride gas. Furthermore, the mixture of trichlorobenzene produced by this means is usually highly colored and must be extensively treated to remove the color.

The above method of dehydrochlorination of benzene hexachloride is also deficient in that the reaction sequence cannot be stopped at any intermediate products, but always proceeds to formation of the completely aromatized trichlorobenzenes. Thus, valuable chemical intermediates and biocides present in the reaction mixture such as 2,3,4,5,6-pentachlorocyclohexene-1, are not recovered but are converted to the completely aromatized end-products.

Another method used for the dehydrochlorination of benzene hexachloride consists of heating the benzene hexachloride with a solution of alkali, such as sodium hydroxide or potassium hydroxide. This procedure is extremely inefficient in that the valuable hydrogen chloride produced in the dehydrochlorination is converted by the action of the alkali into relatively valueless sodium chloride or potassium chloride respectively.

In the formation of benzene hexachloride by addition chlorination of benzene, varying amounts of monochlorobenzene hexachloride and dichlorobenzene hexachloride are usually formed. The dehydrochlorination of these compounds would lead to the formation of valuable compounds, such as tetrachlorobenzenes and pentachlorobenzene.

A principal object of my invention, therefore, is to provide a new and improved method for the dehydrochlorination of polychlorocyclohexanes. Another object is to provide a catalytic process for producing a mixture of trichlorobenzenes in which 1,2,4-trichlorobenzene predominates over 1,2,3-trichlorobenzene to a degree not heretofore achieved.

Another object is to provide a method of dehydrochlorinating benzene hexachloride whereby a preponderant amount of 1,2,4-trichlorobenzene, together with 2,3,4,5,6-pentachlorocyclohexene-1, is formed. Another object is to provide a practicable commercial means for the dehydrochlorination of benzene hexachloride. Still another object is to provide a method for greatly increasing the rate of dehydrochlorination of benzene hexachloride. A further object is to provide a method for the dehydrochlorination of benzene hexachloride in which hydrogen chloride in high purity is produced as one of the products. Another object is to produce a mixture of trichlorobenzenes which are water-white in color and need no purification for color removal. Still another object is to provide a means for the catalytic dehydrochlorination of monochlorobenzene hexachloride and dichlorobenzene hexachloride.

I have discovered that benzene hexachloride and related compounds, such as monochlorobenzene hexachloride and dichlorobenzene hexachloride can be readily and efficiently catalytically dehydrochlorinated at a high reaction velocity to yield mixtures of isomeric polychlorobenzenes, by contacting the polychlorocyclohexane with a selective, highly specific catalyst, as described hereafter. In the case of benzene hexachloride, the proportion of 1,2,4-trichlorobenzene in the product mixture is markedly higher than has been heretofore obtained. Moreover, my invention can be carried out so that under certain conditions substantial quantities of polychlorocyclohexenes are obtained. The production of cyclic olefins under conditions which permit them to be isolated before being further dehydrochlorinated is an important feature of my invention.

By benzene hexachloride I mean either a total stereoisomeric mixture of 1,2,3,4,5,6-hexachlorocyclohexanes, such as is produced in the additive chlorination of benzene (hereafter designated as "crude" benzene hexachloride), or any of the individual 1,2,3,4,5,6-hexachlorocyclohexane stereoisomers or any mixture of two or more of the stereoisomeric 1,2,3,4,5,6-hexachlorocyclohexanes, including a mixture such as that arising when the gamma isomer has been removed from a stereoisomeric mixture.

The catalysts which are suitable for use in my process comprise essentially elementary carbon. The preferred forms of carbon for use in my process are those characterized by having an extremely large surface-to-volume ratio. Examples of forms of carbon having a large surface-to-volume ratio include various forms of the so-called activated carbon; that is, carbon which has been treated at elevated temperatures with steam or carbon dioxide; and also such forms as charcoal and the like. On the other hand, forms of carbon such as coke, graphite or diamond which do not possess a large surface-to-volume ratio give inferior results in my process.

Means of operation of my invention will be more clearly understood by reading the following example which illustrates one mode of operation of my invention. All parts and percentages used in all examples herein, unless otherwise stated, are parts or percentages by weight.

*Example 1*

Crude benzene hexachloride was melted in a feed hopper which was heated externally. By means of a proportioning meter the molten benzene hexachloride was fed to the upper portion of a reaction chamber consisting of a vertical elongated cylindrical tube, filled with charcoal having a particle size from 10 to 4 mesh. The reactor chamber was heated by external means to a temperature of 250–350° C. As the molten benzene hexachloride came into contact with the hot catalyst it became partially vaporized and evolution of hydrogen chloride was observed. The partially vaporized reaction mixture passed downward through the catalyst bed and thence through a water-cooled condenser wherein those portions of the organic reaction products which were in the form of vapor were condensed. Following the condenser the reaction product stream was passed into a liquid-gas disengaging vessel from which pure hydrogen chloride gas was taken off overhead and the liquid products were taken off through a liquid discharge leg in the bottom of the disengaging vessel. The liquid fraction was analyzed for its constituents by means of infrared analysis.

The following group of examples, in which dehydrochlorinations were carried out in an apparatus similar to that employed in Example I, will serve to illustrate the advantages and benefits obtained when benzene hexachloride is dehydrochlorinated in accordance with my invention.

This example illustrates results obtained in dehydrochlorination of benzene hexachloride in mixed liquid-vapor phase.

*Example II*

Using the method of Example I, crude benzene hexachloride was fed to the catalyst chamber at the rate of 7 parts per minute. 35 parts of the catalyst used in Example I were present in the reaction vessel which was heated to 296° C. Analysis of the water-white liquid product showed 5.8 percent 1,2,3-trichlorobenzene and 83.6 percent of 1,2,4-trichlorobenzene, or a ratio of 1,2,4-trichlorobenzene to 1,2,3-trichlorobenzene of 14.5. All benzene hexachloride fed to the reaction chamber was converted to one or more dehydrochlorination products.

When this experiment is repeated with the individual isomers of benzene hexachloride or a mixture of two or more of these isomers, or with monochlorobenzene hexachloride, equally beneficial results are obtained.

Example III illustrates results obtained when utilizing a slightly different mode of operation, namely an increased benzene hexachloride feed rate with subsequent decreased contact time of the benzene hexachloride with the catalyst.

*Example III*

Using the method of Example II, crude benzene hexachloride was fed to a catalyst chamber maintained at substantially 300° C. and containing 33.6 parts of a charcoal catalyst. The rate of feed of benzene hexachloride to the reaction chamber was 17 parts per minute. The water-white liquid product was found to contain 55.5 percent 1,2,4-trichlorobenzene, 6.5 percent 1,2,3-trichlorobenzene, and 8.9 percent 2,3,4,5,6-pentachlorocyclohexene-1. The ratio of 1,2,4-trichlorobenzene to 1,2,3-trichlorobenzene was therefore 8.5. Substantially all of the benzene hexachloride fed to the reactor was consumed.

Individual benzene hexachloride isomers, mixtures of two or more individual benzene hexachloride isomers, and mixtures of benzene hexachloride with monochlorobenzene hexachloride and dichlorobenzene hexachloride give equally beneficial results in this procedure.

Examples IV and V illustrate results I obtain by operating with benzene hexachloride in the vapor phase.

*Example IV*

Using the procedure described in the preceding examples, a mixture of benzene hexachloride isomers from which essentially all the gamma isomer had been removed was fed at the rate of 12.3 parts per minute to a catalyst chamber containing 43 parts of charcoal. The catalyst chamber was maintained at a temperature of 350° C. Analysis of the water-white liquid reaction product showed 83.1 percent 1,2,4-trichlorobenzene and 5.4 percent 1,2,3-trichlorobenzene, or a ratio of 1,2,4-trichlorobenzene to 1,2,3-trichlorobenzene of 15.5. All benzene hexachloride fed to the reactor was consumed.

When this experiment is repeated with any of the individual isomers of benzene hexachloride or with crude benzene hexachloride, or with monochlorobenzene hexachloride or with dichlorobenzene hexachloride, similar results are obtained.

*Example V*

In this example all conditions were maintained the same as in Example IV except that less catalyst was used, thereby effectively decreasing the average residence time of benzene hexachloride in the catalytic chamber. In other words, the contact time of benzene hexachloride with the catalyst was decreased from that in Example IV.

A mixture of crude benzene hexachloride from which essentially all the gamma isomer had been removed was fed at the rate of 12.3 parts per minute to a catalyst chamber maintained at 350° C. The amount of catalyst present was 34 parts. Infrared analysis of the water-white liquid reaction products showed 83.0 percent 1,2,4-trichlorobenzene, 6.0 percent 1,2,3-trichlorobenzene and 2.4 percent 2,3,4,5,6-pentachlorocyclohexene-1. The ratio of 1,2,4-trichlorobenzene to 1,2,3-trichlorobenzene was therefore 13.8.

When this experiment is repeated with any of the individual isomers of benzene hexachloride or with crude benzene hexachloride, or with monochlorobenzene hexachloride or with dichlorobenzene hexachloride, or mixtures thereof, results obtained are similarly advantageous.

In Example VI another mode of operation of my invention, namely that of operating with benzene hexachloride completely in the liquid phase, is illustrated.

*Example VI*

To a reaction vessel equipped with a mechanical agitator, a temperature measuring device and a packed distillation column was charged 100 parts of crude benzene hexachloride and 1 part of "activated carbon." To the top of the packed distilling column was connected a condenser, a variable take-off distilling head containing a temperature measuring device, a distillate cooler and a tared hydrogen chloride absorber containing sodium hydroxide solution. The reaction vessel was heated by controlled external means, and the agitator was started as soon as the charge was fluid enough to be stirred. The reaction was considered to have started when hydrogen chloride fumes were observed. After a substantial reflux in the distillation column was established, distillate was taken off at a rate sufficient to maintain the reactor temperature at 260–290° C. during the major part of the run. The reaction rate was determined by measuring the rate of increase in weight of the solution in the hydrogen chloride absorber. The total reaction time was 44 minutes and the 50 percent reaction time was 15 minutes. The temperature of the vapor in the take-off head gradually rose from about 105° C. to 210° C. during the course of the run. The distillate comprised 51 parts of product which, by infrared analysis, was found to comprise 28 parts of 1,2,4-trichlorobenzene, 3 parts of 1,2,3-trichlorobenzene, and 10 parts of 2,3,4,5,6-pentachlorocyclohexene-1. The ratio of 1,2,4-trichlorobenzene to 1,2,3-trichlorobenzene was therefore 9.2.

When this experiment is repeated with any of the individual isomers of benzene hexachloride or any mixtures of two or more of these isomers, or with monochlorobenzene hexachloride or with dichlorobenzene hexachloride, equally beneficial results are obtained.

In order to contrast the results obtained with my invention with those obtained by prior methods, the following example illustrates the results obtained with a ferric chloride catalyst.

Example VII

Using the method described in Example VI, a mixture of 100 parts of crude benzene hexachloride and three parts of anhydrous ferric chloride was heated to a reactor temperature of 275–287° C. The 50 percent reaction time was 31 minutes. Analysis of the reaction mixture after distillation showed it to comprise 1,2,4-trichlorobenzene and 1,2,3-trichlorobenzene in the ratio of only 3.1 to 1. No 2,3,4,5,6-pentachlorocyclohexene-1 was observed.

Thus, from the foregoing examples, it can be clearly seen that my invention provides a means for obtaining a water-white product comprising 1,2,4-trichlorobenzene in proportions higher than has heretofore been obtainable, together with small amounts of 1,2,3-trichlorobenzene. Also, my process can be so controlled as to give substantial quantities of 2,3,4,5,6-pentachlorocyclohexene-1 as one of the products. In addition, reaction rates are greatly accelerated and other objects of the invention as enumerated above are accomplished.

I have found that my invention is operable when extremely short contact times are employed. When the contact time of polychlorocyclohexane with my carbon catalyst is as short as $\frac{1}{10}$ of a second I find that the polychlorocyclohexane is completely cracked and it is possible to employ even shorter contact times than this. In general, shorter contact times favor the formation of polychlorocyclohexenes as isolable products. There is no harm in using exceedingly long contact times, although there is no particular gain in using contact times of longer duration than of the order of a few minutes when the reaction is carried out with the polychlorocyclohexane in the vapor phase. In the liquid phase modification contact times up to a few hours may be desirable. In general, preferable contact times vary inversely with temperature employed, that is, at higher temperatures relatively short contact times are sufficient whereas at lower temperatures contact times can be somewhat extended.

Temperature is of importance to my invvention. In general, dehydrohalogenation rates below about 180° C. are so slow that I prefer not to operate below this temperature. At extremely high temperatures side reactions such as the thermal decomposition of trichlorobenzene become limiting. When operating with liquid polychlorocyclohexanes I prefer to hold the temperature within the range 180–300° C. and I have found that in the vapor phase the best results are obtained when operating in the range 250–350° C. Temperatures of the order of 350° C. give particularly smooth operation when operating with vapor phase benzene hexachloride. When operating with mixed liquid-vapor phase polychlorocyclohexanes temperatures to be chosen will be decided on the basis of the foregoing.

There are no particular pressure limits to my invention although in general, for convenience, it will be preferable to operate at or near atmospheric pressure. Good results are obtained with pressures as low as about 100 millimeters of mercury and as high as 3 to 4 atmospheres.

As feed materials I have found that crude benzene hexachloride, any of the individual benzene hexachloride isomers, any mixture of individual benzene hexachloride isomers, monochlorobenzene hexachloride, dichlorobenzene hexachloride, or any mixture of benzene hexachloride with either monochlorobenzene hexachloride or dichlorobenzene hexachloride or both are quite suitable. As explained above, any form of carbon possessing a high surface-to-volume ratio can function as a catalyst in my invention. The amount of catalyst as compared with the throughput of polychlorocyclohexane is not critical. However, as is illustrated in several of the above examples, huge throughputs of polychlorocyclohexane can be employed with a relatively small amount of catalyst. In some runs the polychlorocyclohexane throughput has amounted to as much as 800 times the weight of catalyst in the catalyst chamber. The particle size of the catalyst is not particularly important. Good results are obtained with finely divided carbon and with massive carbon. Again it is the surface-to-volume ratio as exhibited through porosity rather than through particle size that is important.

In some cases, for example when high yields of polychlorocyclohhexenes are desired, it is advantageous to dilute the polychlorocyclohexane vapor with an inert gas as a diluent. This cuts down the effective contact time of the polychlorocyclohexane with the catalyst and thus leads to the formation of enhanced amounts of polychlorocyclohexene.

I claim:

1. A process for making trichlorobenzene having an enhanced 1,2,4-trichlorobenzene concentration by dehydrochlorination of benzene hexachloride, which comprises contacting benzene hexachloride at a temperature of between about 180° C. and a temperature at which substantial decomposition of trichlorobenzene takes place with activated carbon.

2. The process of claim 1 wherein the temperature is between about 250°–350° C.

3. The process of claim 2 wherein the benzene hexachloride contacts the activated carbon for a period of time of at least $\frac{1}{10}$ second.

4. A process for making trichlorobenzene having an enhanced 1,2,4-trichlorobenzene concentration by dehydrochlorination of benzene hexachloride which comprises contacting benzene hexachloride at a temperature of 190° to 300° C. with activated carbon.

References Cited in the file of this patent

UNITED STATES PATENTS

| | | |
|---|---|---|
| 2,467,123 | Fleck et al. | Apr. 12, 1949 |

FOREIGN PATENTS

| | | |
|---|---|---|
| 503,063 | Belgium | Nov. 5, 1951 |
| 955,816 | France | July 4, 1949 |

OTHER REFERENCES

Galitzenstein et al.: "Jour. Soc. Chem. Ind.," vol. 69, pages 298–304 (1950).